June 6, 1967 P. F. JACOBI 3,323,504
INTERNAL COMBUSTION ENGINE SPEED GOVERNOR
Filed Dec. 21, 1964 4 Sheets-Sheet 1

INVENTOR.
PAUL F. JACOBI
BY
Barnes, Kisselle, Raisch & Choate
ATTORNEYS

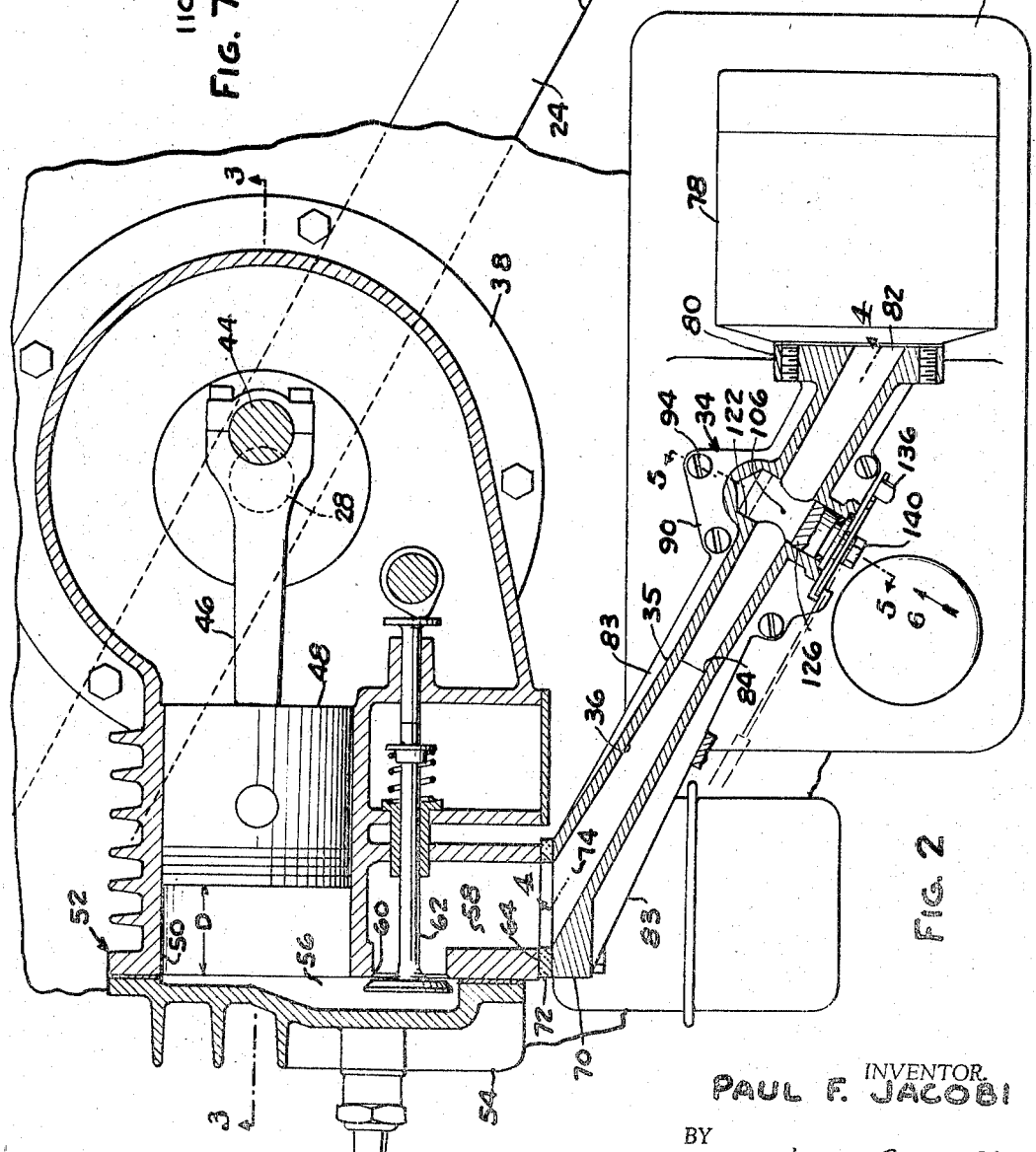

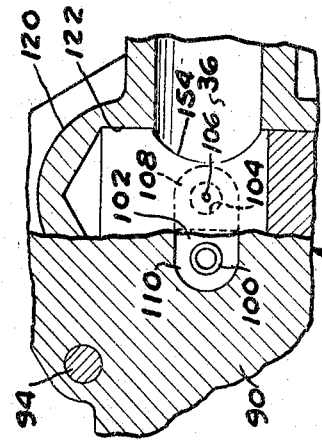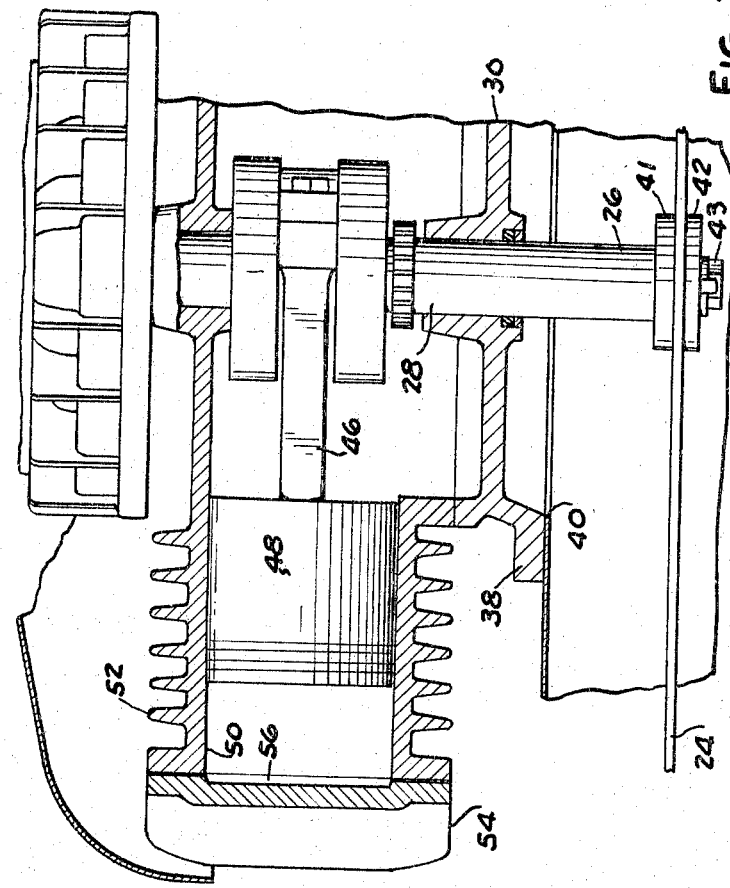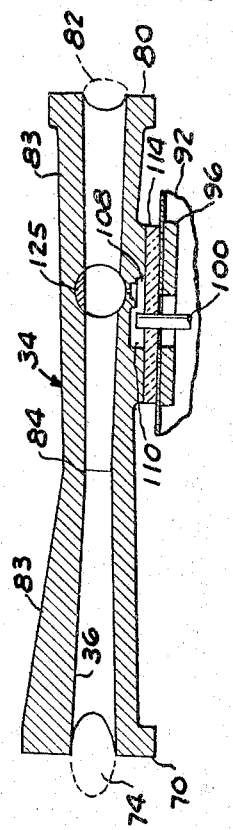

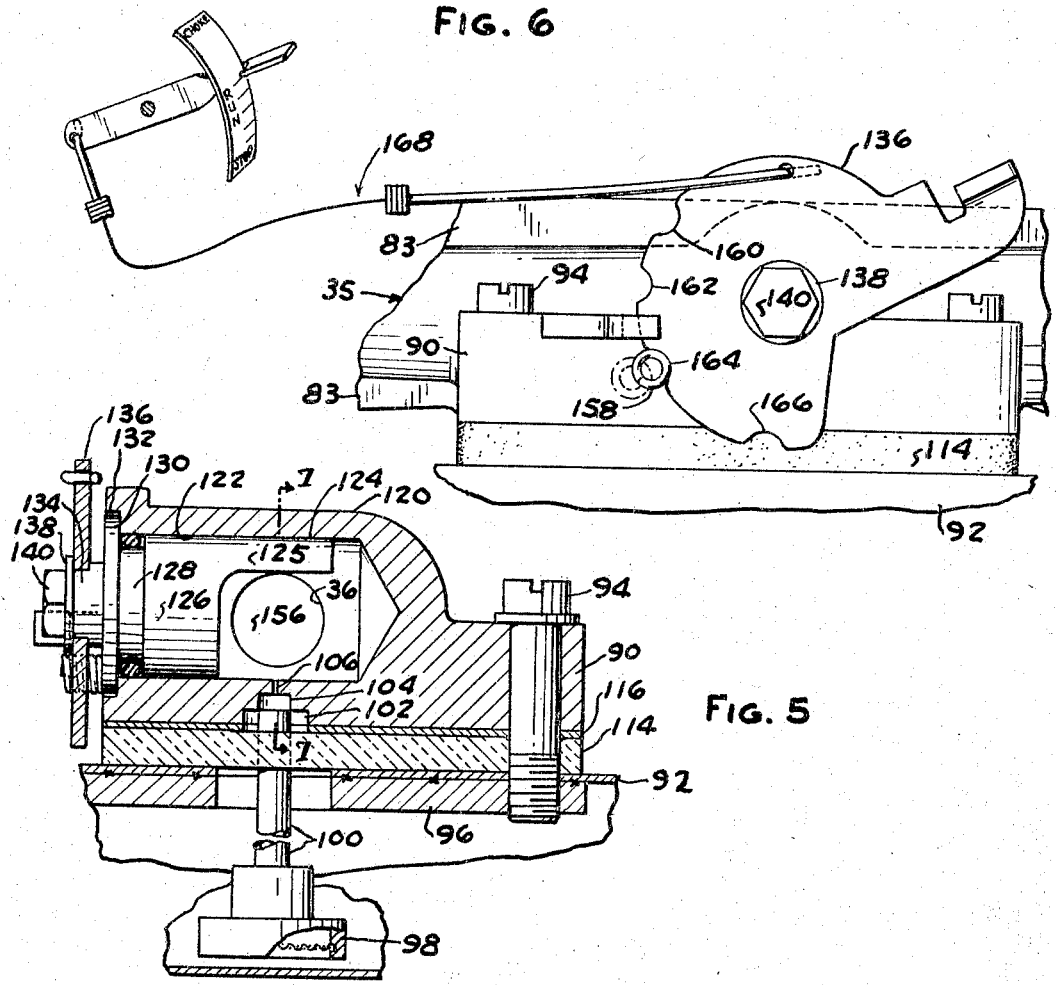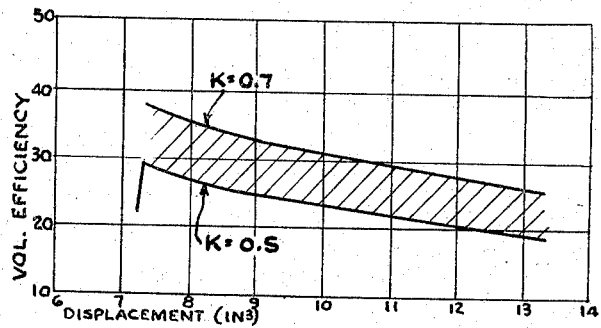

United States Patent Office 3,323,504
Patented June 6, 1967

3,323,504
INTERNAL COMBUSTION ENGINE
SPEED GOVERNOR
Paul F. Jacobi, New Holstein, Wis., assignor to Tecumseh Products Company, a corporation of Michigan
Filed Dec. 21, 1964, Ser. No. 420,018
14 Claims. (Cl. 123—103)

This invention relates to an internal combustion engine for a lawn mower having a rotating blade driven by the engine and more particularly to an intake pipe for the engine that functions as a carburetor and also functions as a speed governor by restricting the flow of a combustible charge through the pipe when the engine tends to run faster than a predetermined maximum speed for a predetermined load due to the blade.

Lawn mowers may be provided with a small horsepower, single-cylinder, internal combustion engine for rotating a cutting blade. In a reel-type mower, the cutting blade may be in the form of a reel that rotates about a horizontal axis. In a rotary-type mower, single or multiple flat blades rotate about a vertical axis. With both reel and rotary mowers, a governor is used to regulate the maximum speed of the engine. With a rotary mower, the maximum governed speed may be for a torque load presented by the blade during unobstructed rotation. With a reel mower, the maximum governed speed may be at the no-load condition when the blade is disconnected from the engine by conventional clutch means. In a conventional mechanical governor a throttle valve in the carburetor is regulated in accordance with the speed of the engine. One type of mechanical governor uses an air vane responsive to air pressure from fan blades on the flywheel of the engine to regulate the throttle valve through suitable mechanical linkages. Centrifugal governors responsive to the speed of the engine have also been used. However, both the vane and centrifugal governors increase substantially the cost of the engine and therefore the cost of the lawn mower on which an engine having a governor is used.

It is an object of this invention to provide a lawn mower having a rotating blade that is driven by a single-cylinder, internal combustion engine which does not require mechanical governors of the type set forth above.

Further objects of this invention are to provide a speed governor for single or multiple cylinder, internal combustion engines that is structurally simple, that has no moving parts, that can be manufactured economically, and that is usable with engines presently available without modification of the engine.

It is a further object of this invention to provide a suction-type carburetor having a simple and improved fuel metering device.

In the drawings:

FIG. 2 is a horizontal section through the engine taken generally along line 2—2 in FIG. 1 to illustrate the cooperation of the engine parts and the blade and also the details of an intake pipe which functions as a carburetor and which restricts the charge flow at a predetermined maximum speed and load of the blade in accordance with the present invention.

FIG. 3 is a vertical section taken on line 3—3 of FIG. 2 to further illustrate the engine and the rotary blade.

FIG. 4 is a sectional view taken on line 4—4 of FIG. 2 to further illustrate the intake pipe and a fuel inlet in the pipe constructed in accordance with a further aspect of this invention.

FIG. 5 is a sectional view taken on line 5—5 of FIG. 2 to illustrate a combination choke-throttle valve particularly suited for use with the intake pipe of the present invention.

FIG. 6 is a fragmentary view taken generally in the direction of the arrow 6 in FIG. 2 to illustrate the exterior of the pipe and controls for the valve.

FIG. 7 is a fragmentary section taken on line 7—7 of FIG. 5 to further illustrate the rotary valve with the valve being shown in a wide-open throttle position.

FIGS. 8 and 9 are sectional views corresponding to FIG. 7 with the valve in a full choke position and an idle position respectively.

FIG. 10 is a horizontal section taken on line 10—10 of FIG. 7 to illustrate an expansion chamber provided in the fuel inlet.

FIG. 11 is a graph showing the relationship of volumetric efficiency to displacement for an engine governed at a predetermined maximum speed for a predetermined torque load in accordance with the present invention.

Figure 1:
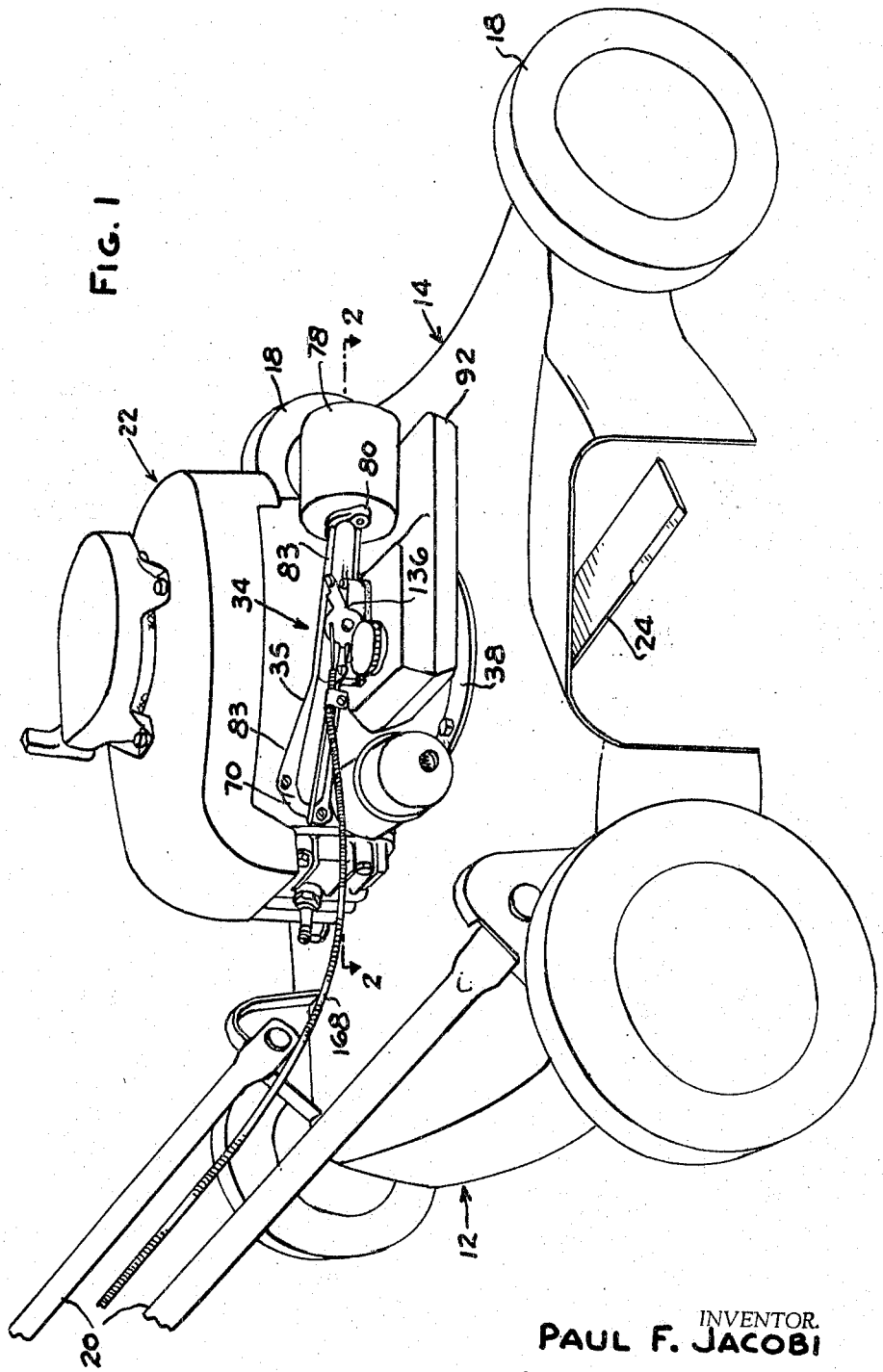
FIG. 1 is a perspective view of a manually propelled lawn mower having a rotary blade driven by a single-cylinder, internal combustion engine whose maximum speed is governed in accordance with the present invention depending on the speed and load of said blade.

FIG. 1 shows a rotary lawn mower 12 having a conventional housing 14 on which four wheels 18 and a handle 20 are mounted in a manner conventional to manually propelled rotary lawn mowers. Mounted on the top of housing 14 is a small horsepower, four-stroke, single-cylinder, internal combustion engine 22. A rotary blade 24 is fixed on a lower extension 26 of a crankshaft 28 journalled in the crankcase 30 of engine 22 (FIG. 3). Also mounted on engine 22 is a carburetor 34 in the form of a ribbed pipe 35 having an elongated intake passageway 36. In accordance with one aspect of this invention, passageway 36 is dimensioned so as to restrict flow of a combustible charge from carburetor 34 to engine 22 to an amount just sufficient to maintain a predetermined maximum speed of crankshaft 28 for a predetermined torque load due to blade 24. Although pipe 35 and passageway 36 are disclosed herein for governing the maximum speed of a single-cylinder engine by restricting charge flow, this invention can also be applied to govern the speed of multiple-cylinder engines by properly dimensioning the intake passageway.

More particularly, crankcase 30 is fashioned with a lower lateral flange 38 bolted on the top of housing 14 so that extension 26 projects downwardly through an aperture 40 (FIG. 3) in housing 14. Blade 24 is fixedly clamped between a lateral flange 41 on extension 26 and a washer 42 by a nut 43 (FIG. 3) threaded on the end of extension 26. Conventional keying (not shown) may be used to assure that blade 24 is nonrotatably mounted on extension 26. Crankshaft 28 also includes a crankpin 44 (FIG. 2) on which is mounted a connecting rod 46 which connects the crankshaft 28 with a reciprocating piston 48 in a cylinder 50 formed in a block 52 of engine 22. A head 54 is mounted on block 52 to close the open end of cylinder 50 and provide a combustion chamber 56 between head 54 and piston 48. Block 52 is also formed with an intake duct 58 (FIG. 2) communicating with chamber 56 through a port 60 which is opened and closed by an intake valve 62 in a conventional manner. Duct 58 opens at a flat mounting face 64 on the outside of block 52.

One end of pipe 35 is fashioned with a skewed base 70 which is bolted on block 52 at face 64 with a gasket 72 disposed therebetween. One end of passageway 36 opens in base 70 to form an outlet port 74 which communicates with duct 58 when base 70 is bolted on block 52. An air filter 78 is bolted to a skewed base 80 on the other end of pipe 35. The other end of passageway 36 opens in base 80 to form an inlet port 82 which communicates with filter 78 to supply air to passageway 36. Pipe 35 is fashioned with a plurality of longitudinal ribs 83 extending between bases 70, 80 to strengthen the pipe. Pipe 35 is preferably formed of cast aluminum although other suitable materials and processes may be used. Where pipe 35 is formed by casting, core dies (not shown) used to form passageway 36 will have a slight draft. This draft in the core dies will slightly taper passageway 36 radially inwardly from each of the ports 74, 82 to a juncture 84 where the core dies abut during the casting process.

Intermediate bases 70, 80, pipe 35 is formed with a horizontal lateral flange 90 on which a fuel tank 92 is mounted by studs 94 threaded into a plate 96 (FIG. 5) which is secured to the inside of the top of tank 92 as by welding (FIG. 5). Fuel is conducted from tank 92 into passageway 36 through a filter 98, a pipe 100, a stepped chamber 102, a counterbore 104, and an orifice 106 (FIGS. 5, 7, and 10). Chamber 102 has a shallow portion 108 directly beneath counterbore 104 and a deeper enlarged portion 110 offset (FIGS. 4 and 10) from counterbore 104 to accommodate the upper end of pipe 100. Pipe 100 is press-fitted through a flat plate 114 clamped between the top of tank 92 and flange 90 on pipe 35 by studs 94. A gasket 116 is disposed between plate 114 and flange 90. Pipe 100 projects upwardly above plate 114 and portion 110 of chamber 102 with the top of pipe 100 being substantially flush with the top wall of portion 108 as viewed in FIG. 7.

Directly above orifice 106, pipe 35 has an enlarged body 120 (FIG. 5) formed with a cylindrical cavity 122 having a circular cross section and being disposed at a right angle to passageway 36. Orifice 106 opens into cavity 122 to supply fuel to passageway 36. Disposed in cavity 122 is a rotary valve 124 the axis of which is vertically in line with orifice 106. Valve 124 generally comprises an eccentric control arm 125 extending in a direction laterally of passageway 36 and a cylindrical base 126 which fits closely but rotatably in cavity 122 laterally outwardly of passageway 36. Base 126 is fashioned with a circumferential groove 128 and a radial flange 130 which is disposed in a counterbore 132 in body 120. Extending outwardly from flange 130 is a shank 134 on which a throttle lever 136 is nonrotatably keyed, as by mating squared portions. Lever 136 is retained on shank 134 by a washer 138 held in place by a bolt 140 threaded into shank 134. An O-ring is disposed in groove 128 in contact with the wall of cavity 122 to serve as a seal.

As shown in FIGS. 4, 5, and 7, arm 125 is formed with a radially outer peripheral surface 146 having a curvature corresponding to the curvature of cavity 122. Arm 125 fits closely but rotatably within cavity 122. Surface 146 intersects a flat chordal surface 148 to form a leading edge 150 and a trailing edge 152. The radial thickness of arm 125 is such that surface 148 is flush with the top of passageway 36 when arm 125 is in its upper position as viewed in FIGS. 5 and 7. Passageway 36 communicates with cavity 122 through a pair of ports 154, 156. Arm 125 extends axially of cavity 122 beyond passageway 36 so that ports 154, 156 may be selectively restricted by surface 146 when valve 124 is rotated. FIG. 7 shows valve 124 with arm 125 in its fully open position corresponding to wide-open throttle. FIG. 8 illustrates arm 125 rotated clockwise from its position illustrated in FIG. 7 to a full choke position substantially closing port 154 upstream of orifice 106. FIG. 9 illustrates arm 125 rotated counterclockwise from its position illustrated in FIG. 7 to an idle position substantially closing port 156 downstream of orifice 106. As illustrated by broken lines in FIG. 9, arm 125 may be rotated so as to fully close port 154 upstream of orifice 106 or to fully close port 156 downstream of orifice 106 to turn engine 22 off. Arm 125 may also be rotated to provide any desired restriction of ports 154, 156 and corresponding choke or throttle settings. A yieldable stop in the form of a spring 158 (FIG. 6) having one end fixed in flange 90 engages in grooves 160, 162, 164, 166 on the periphery of lever 136 to stop arm 125 in positions corresponding to off, idle, wide-open throttle, and choke, respectively. Lever 136 may be rotated to control the position of arm 125 by a suitable mechanical linkage indicated generally by numeral 168.

In accordance with one aspect of this invention, passageway 36 is generally cylindrical and except for chamber 122 preferably has a substantially uniform circular cross section through its entire length from port 82 to port 74. As compared to carbureting passageways in conventional suction-type carburetors, passageway 36 has a small diameter and long length dimensioned so as to govern the top speed of engine 22 at a predetermined value for a predetermined torque load at the crankshaft 28 due to blade 24. In general, this result is achieved by dimensioning the length-to-diameter ratio of passageway 36 so that it provides, in effect, a restricting orifice that limits the flow of an air-fuel mixture from passageway 36 into duct 58 to a value just sufficient to maintain the predetermined maximum speed for a predetermined output torque load when arm 125 is in the wide-open throttle position.

The resistance to fluid flow in passageway 36 depends upon the head loss due to friction with the wall of the passageway. This may be defined by the relationship $$h_f = (f)\left(\frac{L}{4m}\right)\left(\frac{V^2}{2g}\right) \quad \text{(Equation 1)}$$

where $h_f$=friction head (loss)
$f$=pipe friction factor
$m$=hydraulic radius=area/perimeter
$g$=gravitational force
$L$=length of pipe
$V$=velocity of flow.

For circular cross section pipes $4m$ equals the diameter $d$ so that $h_f$ is defined by the relationship $$h_f = (f)\left(\frac{L}{d}\right)\left(\frac{V^2}{2g}\right) \quad \text{(Equation 2)}$$

From these relationships, it is apparent that friction looses in passageway 36 increase as the square of the velocity of the charge flowing therethrough. Additionally, increasing the $L/m$ and $L/d$ factors increases the total friction loss in passageway 36. Therefore, the length of passageway 36 should be substantially greater than its diameter if of circular cross section or stated differently, its length should be substantially greater than four times its hydraulic radius regardless of its cross sectional shape. With engine passageway 36 dimensioned such that the air-fuel charge at the desired maximum speed and load will be just sufficient to maintain such speed, when the load increases, the speed decreases and the restriction to flow in passageway 36 decreases at a rate proportional to the square of the flow velocity. This enables a sufficient quantity of fuel-air mixture to flow through passageway 36 to meet the demands of the increased load at a lower speed.

Since pipe 35 has been disclosed as a cast pipe and passageway 36 as having a slight taper incident to the casting process, the smallest diameter of passageway 36 at juncture 84 provides a slight venturi effect. While this venturi effect will affect the maximum charge flow rate, this effect is merely the result of conventional die casting techniques and is not necessary in order for the passageway 36 to provide the governing function in accordance with the present invention. As shown in FIGS. 2 and 4, the venturi formed at the juncture 84 is substantially downstream from orifice 106.

When starting engine 22, lever 136 is moved to the choke position with spring 158 stopped in groove 166 so that arm 125 substantially closes port 154 as illustrated in FIG. 8. The engine is cranked in any conventional manner and after the engine is running it may be operated at wide-open throttle or idle by moving lever 136 so that spring 158 stops in either groove 164 or 162, and arm 125 is disposed as illustrated in either FIG. 7 or 8, respectively. On the intake stroke of piston 48, decreased pressure in passageway 36 draws air through filter 78 and port 82 over orifice 106 and also draws fuel from tank 92 through pipe 100 into chamber 102 and through orifice 106 into cavity 122 and passageway 36 to be mixed with incoming air from port 82. When valve 124 is opened fully, arm 125 being in its top position corresponding to wide-open throttle as illustrated in FIG. 7, engine 22 will be running at the maximum governed speed for the load presented by blade 24 only. When the load on engine 22 increases, as for example when blade 24 is cutting grass, the speed of engine 22 decreases, in turn decreasing the velocity of the air-gas charge in passageway 36 and thus reducing the flow restriction so that the charge from carburetor 34 is sufficient to develop the required torque at a lower speed and greater load.

With conventional mechanical governors, the position of a throttle valve is regulated to maintain a maxium governed speed. Varying the throttle valve position in effect varies the flow restriction in the intake passageway by changing the diameter of the passageway and thereby the length-to-diameter ratio of the passageway. As contrasted with a conventional mechanical governor, with the invention described hereinabove the diameter and therefore the length-to-diameter ratio of passageway 36 remains constant and flow restriction varies substantially as a function of the charge velocity through the passageway. With the invention described hereinabove, the engine speed will drop to meet an increased load. However, on a rotary lawn mower, the speed is not decreased to an extent sufficient to materially impair cutting and is therefore not objectionable.

The construction of the fuel passageway, including filter 98, pipe 100, chamber 102, counterbore 104, and orifice 106, eliminates the need for a check valve in pipe 100 and also forms a fuel reservoir to insure available fuel to be drawn through orifice 106. When intake valve 62 of engine 22 closes, there is a substantial charge rebound toward port 82 due to the momentum of the charge producing momentary pressure increases in passageway 36. However, the increased pressure does not produce appreciable reverse fuel flow in pipe 100 because a large pressure drop between orifice 106 and pipe 100 is absorbed in counterbore 104 and chamber 102. Stated differently, chamber 102, counterbore 104, and orifice 106 cushion the pressure rise in passageway 36 and thereby eliminate the need for a check or foot valve in pipe 100. Additionally, because the upper end of pipe 100 extends above plate 114 into the deep portion 110 of chamber 102, a reservoir is formed in chamber 102 so that on the next intake stroke of piston 48 fuel is immediately available in the shallow portion 108 to be drawn through orifice 106 into cavity 122 and passageway 36.

The governing effect of passageway 36 can also be expressed in terms of the volumetric efficiency of the engine, that is, the ratio of the volume of air-gas mixture drawn into combustion chamber 56 on the intake stroke of the piston 48 to the piston displacement indicated generally by the letter D in FIG. 2. For a given engine that is to be governed at a predetermined speed for a predetermined load, the volumetric efficiency to maintain the predetermined speed at the predetermined load can be determined and then the dimensions of passageway 36 chosen so as to achieve the desired volumetric efficiency.

By way of example and not of limitation, the present invention was applied to a rotary lawn mower that was to be governed at a speed of 3800 r.p.m. for a torque load of 0.5 lb.-ft. due to blade 24 during free rotation thereof. The engine was a commercially available, single-cylinder, three-horsepower engine sold by Tecumseh Products Co. The displacement was 7.75 cubic inches. Without governing, this engine has a normal volumetric efficiency at 3800 r.p.m. of 70 percent. Governing at 3800 r.p.m. for a 0.5 lb.-ft. torque load was achieved by dimensioning passageway 36 to provide a 30 percent volumetric efficiency, or a reduction of 40 percent due to the flow restriction in passageway 36 at 3800 r.p.m.

By way of further example, for the above identified three-horsepower engine, where the maximum speed was governed at 3800 r.p.m. for a load of 0.5 lb.-ft., passageway 36 was 6.625 inches long from the center of inlet port 82 to the center of outlet port 74; orifice 106 was 4.75 inches from outlet port 74; the smallest diameter of passageway 36 was 0.280 inch at juncture 84; juncture 84 was 2.75 inches from outlet port 74; the diameter of passageway 36 at the center of outlet port 74 was 0.406 inch; and the diameter of passageway 36 at the center of the inlet port 82 was 0.468 inch. Orifice 106 had a diameter of 0.018 inch. With the foregoing engine to be governed at 3800 r.p.m. for a load of 0.5 lb.-ft., it has been found that a length-to-diameter ratio in the order of 19 provides effective governing without adversely affecting low speed operation of the engine.

In general, for engine displacements in the range of 6 to 10 cubic inches, the length-to-diameter ratio should be in the range of from 15 to 1 to 25 to 1. The larger length-to-diameter ratios in this range would be used for larger displacement engines in the 6 to 10 cubic inch range. Although very long pipes are desirable to achieve optimum low speed performance, a practical maximum length in the order of 6 to 8 inches provides satisfactory results.

For a given engine, the desired volumetric efficiency at a given speed and load can be determined experimentally. The following relationship between volumetric efficiency and displacement has been determined experimentally for four-stroke, single-cylinder engines at 3800 r.p.m. for a load of 0.5 lb.-ft.

$$VE_d = \frac{4K}{D+1} + 0.05 \qquad \text{(Equation 3)}$$

where $VE_d$ = the desired volumetric efficiency
$K$ = a constant determined experimentally to be between 0.5 to 0.7, and
$D$ = the displacement of the piston.

This range of $K = 0.5$ to $0.7$ provides leeway for variations in valve timing. FIG. 11 shows the experimental results of volumetric efficiency versus displacement for four-stroke, single-cylinder engines at 3800 r.p.m. for 0.5 lb.-ft. load. It has also been found that at the same blade load to govern at a higher or lower r.p.m., a volumetric efficiency equal to $$2 \text{ percent} \times \left(\frac{3800 \pm \text{r.p.m. desired}}{100}\right)$$

may be added or subtracted to determine a corrected volumetric efficiency. Corresponding correction for variations in cutting blade load can also be determined.

As previously mentioned, mechanical governors are also used on reel-type lawn mowers. The maximum speed of an engine on a reel mower may also be governed in accordance with the present invention. For example, with the three-horsepower engine previously identified, the dimensions of the passageway in the intake pipe, corresponding to passageway 36, would be chosen to limit the maximum speed at 3800 r.p.m. for no-load or 0.0 lb.-ft. torque load. This no-load condition is present when the blade is disconnected from the engine. Although governing the top speed at no-load will decrease the torque available when the reel is engaged, high torque is not critical in reel mowers because the reel is driven by the engine through suitable gearing.

I claim:

1. In a lawn mower the combination comprising an internal combustion engine having a combustion chamber, a cylinder, a crank shaft, a piston operatively connected to said crank shaft to reciprocate in said cylinder and a charge intake port for said combustion chamber, a rotatable blade, means for operatively connecting said blade to said crankshaft to be rotated thereby, said blade presenting a predetermined torque load on said engine at a predetermined maximum speed of said engine, and means for governing the speed of said engine at said predetermined maximum speed for said predetermined torque load comprising an intake pipe mounted on said engine, said pipe having a walled intake passageway therethrough for conducting a combustible charge to said engine, one end of said passageway communicating with said intake port, the other end of said passageway serving as an air intake, said passageway having a length-to-hydraulic radius ratio correlated with the fuel-air charge requirements of said engine at said predetermined speed and said predetermined torque load to provide a predetermined restriction to fluid flow due primarily to wall friction along the length of said passageway so that the charge drawn into the combustion chamber through said passageway maintains said predetermined maximum speed at said predetermined load, said passageway having a cross sectional configuration which remains constant throughout the length thereof when the engine is operating at said governed speed and said predetermined load and when the load on said engine is increased above said predetermined load the engine speed decreases below said predetermined governed speed, said passageway having a wall configuration that is constant at all engine speeds.

2. The combination set forth in claim 1 including manually operable means in said passageway for varying the speed of the engine and wherein said passageway has a length-to-hydraulic radius ratio that is constant for all speeds of and loads on said engine for any given setting of said manually operable means 3. The combination set forth in claim 1 wherein the ratio of the length of said passageway to four times the hydraulic radius of said passageway is in the range of 15 to 1 to 25 to 1.

4. The combination set forth in claim 3 wherein the length of said passageway is in the range of 6 to 8 inches.

5. The combination set forth in claim 3 wherein said engine has a displacement in the range of from 6 to 10 cubic inches and said predetermined maximum speed is in the order of 4,000 revolutions per minute.

6. The lawn mower set forth in claim 1 wherein a throttle valve is operatively disposed in said passageway to control charge flow through said passageway and thereby control the speed of said engine, said throttle valve having a wide-open position at which said engine can develop its maximum speed, said passageway having a length-to-hydraulic radius ratio that is constant for all speeds of said engine and all loads on said engine when said throttle valve is in said wide-open position, and said passageway provides a flow restriction for said wide-open position of said valve to limit the speed of said engine to said predetermined maximum speed for said predetermined load whereby when the load on said engine exceeds said predetermined load, and the speed of said engine decreases from said maximum speed, the flow restriction of said passageway decreases so that said engine receives a charge sufficient to develop the torque required to meet said increased load while said valve remains in said position.

7. The combination set forth in claim 1 wherein the ratio of the length of said passageway to four times the hydraulic radius of said passageway is in the order of 19.

8. The combination set forth in claim 1 wherein said passageway has a circular cross section and the ratio of the length of said passageway to the diameter of said passageway is in the order of 19.

9. The combination set forth in claim 1 wherein said pipe includes a fuel inlet communicating with said passageway intermediate its ends, said inlet being spaced adjacent said other end of said passageway.

10. The combination set forth in claim 1 wherein said intake passageway has a substantially constant circular cross section throughout a major portion of its length.

11. An intake pipe for use in governing the maximum speed of an internal combustion engine of the reciprocating piston type comprising a walled passageway formed with an air inlet at one end thereof and a combustible charge outlet at the other end thereof, fuel metering means communicating with said passageway intermediate said inlet and said outlet, throttle means in said passageway to vary the speed of said engine, said passageway having a length between said air inlet and said charge outlet substantially greater than four times its hydraulic radius so that wall friction restricts flow of said charge at a predetermined maximum speed to a predetermined value, said passageway having a length-to-hydraulic radius ratio that is constant at all engine speeds and loads when said throttle means is in a position at which said engine can develop its maximum speed, and said passageway further having a wall configuration that is constant at all engine speeds.

12. In a lawn mower the combination comprising an internal combustion engine having a combustion chamber, a cylinder, a crankshaft, a piston operatively connected to said crankshaft to reciprocate in said cylinder and a charge intake port for said combustion chamber, a rotatable blade, means for operatively connecting said blade to said crankshaft to be rotated thereby, said blade presenting a predetermined torque load on said engine at a predetermined maximum speed of said engine, means for governing the speed of said engine at said predetermined maximum speed for said predetermined torque load comprising an intake pipe mounted on said engine, said pipe having an intake passageway therethrough for conducting a combustible charge to said engine, one end of said passageway communicating with said intake port, the other end of said passageway serving as an air intake, said passageway having a length-to-hydraulic radius ratio correlated with the fuel-air charge requirements of said engine at said predetermined speed and said predetermined torque load to provide a predetermined restriction to fluid flow so that the charge drawn into the combustion chamber through said passageway maintains said predetermined maximum speed at said predetermined load, and said lawn mower further including means for conducting fuel into said passageway comprising an orifice opening into said passageway intermediate its ends, an expansion chamber having an outlet opening disposed vertically above the bottom of said chamber, said outlet opening communicating with said orifice, a conduit having one end projecting into said chamber, said one end of said conduit having an outlet which opens substantially vertically in line with said outlet of said chamber and offset horizontally from said outlet of said chamber, the other end of said conduit being adapted to receive fuel.

13. The combination set forth in claim 1 wherein said intake pipe comprises a one piece casting, one end of said pipe being mounted on said engine with an outlet end of said passageway communicating with said intake port, air filter means mounted on the other end of said pipe in communication with said other end of said passageway, fuel inlet means communicating with said passageway intermediate its ends so that said engine draws air through said filter directly through said passageway where it is carburetted with fuel from said fuel inlet means and then the carburetted air is drawn directly into said intake port, throttle means in said passageway downstream from said fuel inlet means and adapted to vary the speed of said engine, said throttle means being movable to a wide-open position at which said engine can develop said maximum speed, and said passageway cross sectional configuration remains constant when said throttle means is in said wide-open position with variations in engine speed and load.

14. The combination set forth in claim 1 wherein the ratio of the length of said passageway to four times the hydraulic radius of said passageway is at least 15 to 1.

References Cited

UNITED STATES PATENTS

| | | | |
|---|---|---|---|
| 2,213,447 | 9/1940 | Mitchell | 123—103 |
| 2,836,159 | 5/1958 | Morden | 123—103 |

MARK NEWMAN, *Primary Examiner.*

RALPH D. BLAKESLEE, *Examiner.*